April 9, 1946.   W. H. COLBERT   2,397,947
REAR VIEW MIRROR
Filed Feb. 27, 1943   2 Sheets-Sheet 1

INVENTOR.
William H. Colbert
BY
Corbett, Mahoney + Miller

April 9, 1946.  W. H. COLBERT  2,397,947
REAR VIEW MIRROR
Filed Feb. 27, 1943  2 Sheets-Sheet 2

INVENTOR.
William H. Colbert
BY
Cubett, Mahoney + Miller

Patented Apr. 9, 1946

2,397,947

UNITED STATES PATENT OFFICE 2,397,947

REARVIEW MIRROR

William H. Colbert, Brackenridge, Pa., assignor, by mesne assignments, to Libbey-Owens-Ford Glass Company, Toledo, Ohio, a corporation of Ohio Application February 27, 1943, Serial No. 477,355

8 Claims. (Cl. 88—77)

My invention relates to a rear view mirror. It has to do, more particularly, with a rear view mirror, of the prismoidal type but of novel construction, for use in an automobile. This mirror presents for day driving a clear vision of an object behind the driver and for night driving provides for the location of other cars behind the driver without glare annoyance and dangerous distraction from their headlights.

The first mirrors used in automobiles for rear vision were the ordinary silver mirrors. While these mirrors were considered ideal for daylight driving, it was found that in night driving the high reflectivity of such mirrors gave a glare from the headlights in the rear, such that the mirrors, at night, were not only practically useless, but were actually dangerous to use. Many efforts have been made to secure a rear view mirror device that not only would give satisfactory vision under both day and night driving conditions but would also be free of the objectionable glaring at night. Some of the first such mirrors involved the use of a silver mirror for day driving and a black glass or blackened, or asphalt painted glass to provide a dark mirror for use at night which was mounted in association with the silver mirror. The two mirror surfaces were mounted in many different mechanical frames which would permit the alternate use of the two mirrors. Thus, mounting the two mirrors back to back in a rotatable frame was frequently attempted. Such mechanical mountings have been awkward, expensive and the source of trouble but, in addition to the inconvenience attendant on their use, they failed to give satisfaction because of the low reflectivity of the dark mirror used, which generally was of a value of 5% or less. This gives too low a reflectivity intensity to provide adequate vision for night driving, although no glare is experienced at such poor reflectivity conditions.

The use of a silver mirror for day driving with a screen or colored film or filter which could be dropped in front of the silver mirror at night to reduce its reflectivity, was also attempted but failed to receive any wide use. Such screens introduce multiple surfaces which are not in optical contact and confusing multiple reflections develop, these arising at each of the many surfaces. In a similar way, plastic screens, from lack of planeness of the surfaces, did not permit clear images to be formed.

Attempts have also been made to use the few other metallic reflecting surfaces which could be made, such as gold and copper mirrors, for rear view mirrors. These mirrors reflect 75% and 55% of visible light, which is still too much at night under which conditions they glare severely. For quite a number of years, the automotive industry has found the use of mirrors carrying an opaque lead sulfide reflecting layer particularly useful. This mirror gives 30% reflectivity of light. While this gives good visibility in day driving, I have found it desirable for some purposes to preserve a higher reflectivity for day driving use. Over the past several years, sealed-in-beam headlights have resulted in a lesser diffusion of the light from a headlamp and the former 16 candle power bulbs have been replaced with 32 and 48 candle power bulbs. Thus, the amount of light thrown into the automotive rear view mirror by such lights has been more than tripled. Under these conditions, we have found the use of a mirror of less than 30% reflectivity at night to be desirable.

There has also been considerable attempt to market a wedge-shaped piece of glass, carrying a silver mirror reflective surface on its back, as a rear view mirror for automotive use. In use, this wedge-shaped glass is shifted so that the silver mirror reflection from its back surface can be used in day driving, thus giving a bright reflection for such use. At night, by repositioning the mirror or tilting the same, its front glass surface can be used as a reflecting surface for night driving. The reflection from this glass surface is only 4.5% and such low intensity of reflection is entirely inadequate for night driving. In consequence, despite attempts by automotive manufacturers to use this device, this mirror combination has been a failure.

I have found that a mirror for night driving will provide sufficient reflected light for good adequate vision, if the reflectivity of the night mirror is not less than 10% nor over 30%. A range of reflectivity between 15 and 25% is much better and between 18 and 22% I secure a maximum of visibility with the complete elimination of glare, even with the strongest of headlights. For day driving conditions, a reflectivity of over 30% is desirable and I find values in the range of 40 to 60% particularly useful, as the images in mirrors of these reflectivities in daylight are very clear.

One of the objects of my invention is to provide a mirror of the prismoidal type which is particularly useful as a rear vision mirror for automobiles under present-day driving conditions, both during the day and at night.

Another object of my invention is to provide a mirror of the type indicated consisting of two reflective surfaces, one of which is particularly suitable for day driving and the other of which is particularly suitable for night driving.

Another object of my invention is to provide a mirror of the type indicated in the preceding paragraph which is of such a nature that either of the reflective surfaces may be quickly and easily selected by a slight simple adjustment of the mirror as a whole.

Another object of my invention is to provide a rear view mirror for automobiles of the type indicated in the preceding paragraphs wherein the reflective surface for night driving will have limited reflectivity such that lights of the most intense illumination value, usually encountered on the highways at the present time, will not glare therein.

Another object of my invention is to provide automobile rear view mirrors of the type indicated having the desired reflectivity and of various selected colors.

Various other objects will be apparent from the following description.

My improved mirror comprises two mirror surfaces associated with each other, one surface being particularly suitable for use in day driving and the other surface being particularly suitable for use in night driving. These two mirror surfaces consist of a front mirror surface, which is transparent and of relatively low reflectivity, and a rear mirror surface, which is of less transparency than the front surface or opaque and of a high reflectivity. The front mirror surface is adapted to be used in night driving and the rear mirror surface is adapted to be used in day driving. The two mirror surfaces are arranged, one behind the other with either their lower or upper edges in converging relationship and with the other edges more widely spaced apart. The relative angle between these two surfaces is selected to permit the image in either surface to be made visible to the observer as a separate image merely by properly tilting the mirror slightly forwardly or rearwardly. In using the mirror for day driving, the mirror is tilted so that any image in the high-reflective rear mirror surface will be visible, as a single independent image, to the observer, the observer viewing this image through the transparent front mirror surface. In using the mirror for night driving, the mirror is tilted so that any image in the low-reflective front mirror surface will be visible, as a single independent image, to the observer. The rear mirror surface will have a reflectivity of over 30%, and preferably of 45% to 95%. while the front mirror surface will have a reflectivity of 10% to 30%, and preferably of 15% to 25%. with 18 to 22% giving the best results. In using the mirror for day driving the reflectivity of the rear mirror surface will be toned down due to the light-absorbing nature of the front mirror surface. Thus, the mirror will give a clear bright image, without glare, for day driving and a clear image, without glare, for night driving.

The preferred embodiment of my invention is illustrated in the accompanying drawings wherein similar characters of reference designate corresponding parts and wherein.

The arrangement of the two reflective surfaces in accordance with my invention will be more clearly apparent from the drawings.

Figure 1:
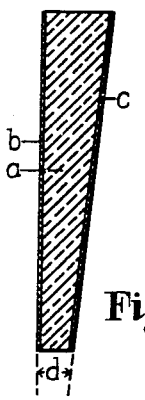
Figure 1 is a vertical sectional view through a mirror made from a wedge-shaped piece of glass according to my invention.
Figure 2:
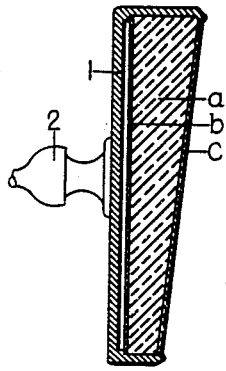
Figure 2 is a similar view showing the mirror mounted in a frame.

In Figure 1, I have illustrated one form which my invention may take. In this instance my mirror will consist of a support of glass $a$ or other transparent material which is wedge-shape in vertical cross-section. The back surface of this support $a$ carries a highly reflective mirror film $b$, having a reflectivity preferably ranging from 45 to 95%. The front surfaces of this support $a$ carry a low reflective mirror film $c$, having a reflectivity preferably ranging from 10 to 30%. The film $c$ is semi-transparent. The film $b$ is preferably opaque although it may also be semi-transparent, preferably of less transparency, however, than the film $c$. If the film $b$ is transparent it may or may not be backed up with an opaque layer. Also, if mounted in a frame, as shown at $l$ in Figure 2, the back side of the frame can serve as an opaque medium for backing up the rear film $b$ if it is transparent. If desired the back of the frame may be coated on its inner surface with a suitable opaque light-absorbing paint.

Figure 3:
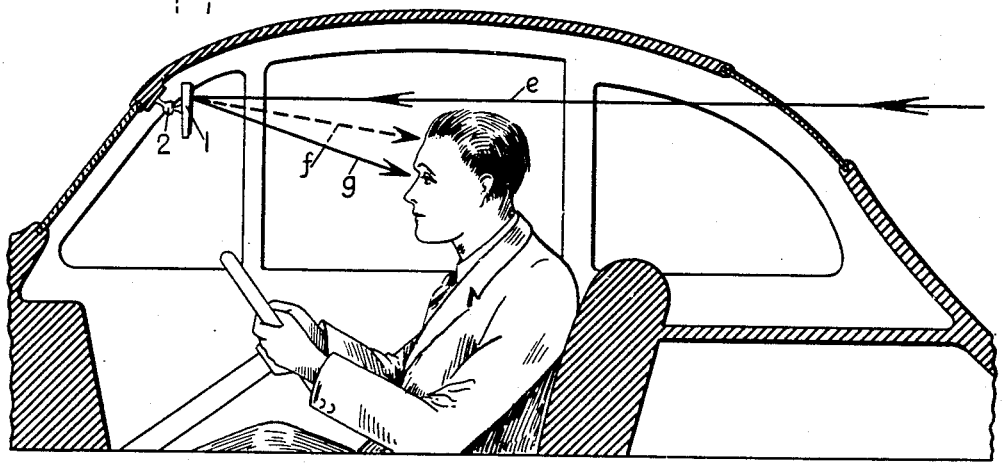
Figure 3 is a diagrammatic view showing how the mirror is used in an automobile.

It will be noted that the mirror surface $b$ and the mirror surface $c$ will be disposed at an angle relative to each other. They are shown converging toward each other at their lower edges but it is to be understood that the reverse arrangement can be provided. The frame $l$, which carries the prism $a$, will be carried by a universal joint 2 (Figure 3) and will be supported in a suitable position in the automobile. The joint 2 is of the usual type so that the mirror can be adjusted to any desired position and will be held in such position.

It is desirable to use the prism mirror as a second surface mirror in daytime driving by employing the highly reflective mirror film $b$. It is desirable to use the prism mirror as a first surface mirror in nighttime driving by employing the low reflective mirror film $c$. The mirror film $b$ or the mirror film $c$ can be selected easily and quickly merely by tilting the mirror, as a whole, slightly either forwardly or rearwardly. This is due to the fact that the mirror films $b$ and $c$ are disposed at an angle relative to each other. This angle is sufficient to permit the image in either film to be made visible to the driver as a separate image independent of the image in the other film. For satisfactory separation of the two images at the usual distance of the automobile driver's eyes from the rear view mirror, so that only one image is apparent, I have found that the angle $d$ between the two mirror surfaces, as shown in Figure 1, preferably should be of the order of 3½ degrees, although I can readily use a deviation between the two surfaces of from 2 to 10 degrees.

In using this mirror, the light beams from an object will enter the mirror, through the rear window of the automobile, along the line *e*. The image of the object will be formed in the mirror and will be reflected therefrom. Reflection from the rear mirror surface *b* will occur along the line *f*. Reflection from the front mirror surface *c* will occur along the line *g*. By properly tilting the mirror, the lines *f* and *g* may be selectively brought to the level of the driver's eyes so that he will see either the image in surface *b* or the image in the surface *c*.

Figure 4:
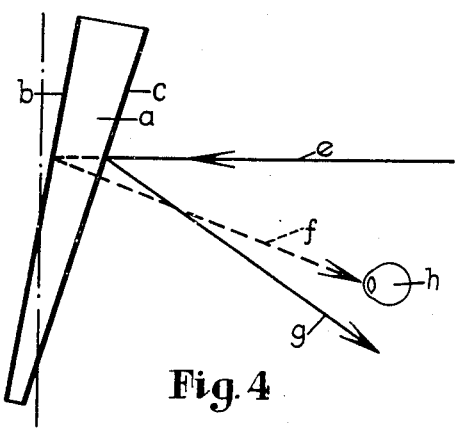
Figure 4 is a diagrammatic view of the mirror showing how the mirror is used for day driving.

Thus, as shown in Figure 4, in the use of the mirror under day driving conditions, the image comes from the second surface *b* or back of the mirror. It is apparent, however, that the light has to travel along line *e* through the semi-transparent mirror film *c*, as it comes into the glass, and again, after reflection at the mirror surface *b* (disregarding refraction), it has to come out through this same film along line *f*. Due to the position of the mirror at this time, line *f* will be at the level of the driver's eyes *h*. Thus, the front surface reflective coating, by the reflecting of 10 to 30% of the light falling on the same, controls the amount of light entering the mirror structure to between 90 and 70% of the incident light. As the semi-transparent reflective film *c* absorbs some of this light during the passage of the light through the same, this film *c* further affects the reflectivity, during day driving conditions, which can be secured from the back reflecting surface *b*. The normal reflecting value of this latter coating also, of course, directly affects the amount of light reflected under these conditions, and we find it preferable that the reflective mirror coating *b* be of a nature that it normally alone would show a fairly high reflectivity, such as 45 to 95%. The choice of the mirror reflective material used in coating *b* and the reflective and light transmission characteristics of the coating *c* are so made that in the daylight use of the second surface mirror a reflectivity value from our new structure of over 30% is secured, this preferably falling within the range of 40 to 60% to eliminate day glare from dazzling roads.

It is apparent that the front surface coating is in use at all times and that it serves several functions. As indicated above, it serves to absorb some of the light entering the mirror, in day driving. It will also reflect some of the light, as shown in Figure 4. The incident light along line *e* will form an image in the front surface *c* which will be reflected along line *g*. However, in this position of the mirror, the line *g* will be below the level of the driver's eyes *h*. Thus, the driver will see only the image reflected from surface *b* and not the one reflected from surface *c*.

Figure 5:
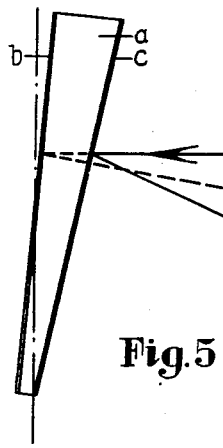
Figure 5 is a similar view of the mirror showing how it is used for night driving.

However, if the mirror is tilted to a slightly different position, as shown in Figure 5, it will be suitable for night driving. In this position, incident light entering the mirror, along line *e*, will be reflected from the front surface *c* along the line *g* which, due to the new position of the mirror, will be at the level of the driver's eyes *h*. Some of the light will also enter the mirror through front film *c* and will be reflected from the rear film *b* along the line *f* (disregarding refraction) but the line *f*, in the new position of the mirror, will be above the level of the driver's eyes *h*. Thus, with the mirror tilted in this manner, the driver will see only the object reflected in the film *c*. Since this film has a low reflectivity, between 15 and 25%, the mirror in this position will be particularly suitable for night driving and will give a clear image without glare from bright headlights The triangular wedge or prism *a* may be made of any suitable transparent material, such as glass or plastic. A suitable plastic is a methacrylate resin. In place of the solid prism, I may use two pieces of flat glass as the carriers or supports for the two mirror films. As shown in Figures 6 to 9, the two pieces of glass will be disposed one behind the other and at a suitable angle to form a prism structure which will function similar to that of Figure 1. Various arrangements of the mirror films can be provided as shown in Figures 6 to 9.

Figure 6:
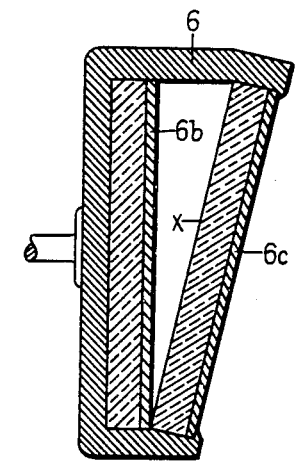
Figure 6 is a vertical sectional view through a mirror made of two pieces of glass disposed at a selected angle, with mirror films arranged in a selected manner.

Thus, in Figure 6, I show two flat pieces of glass which are disposed at a suitable angle in a frame 6. The front glass carries a mirror film 6*c* on its front surface and the rear glass carries a mirror film 6*b* on its front surface.

Figure 7:
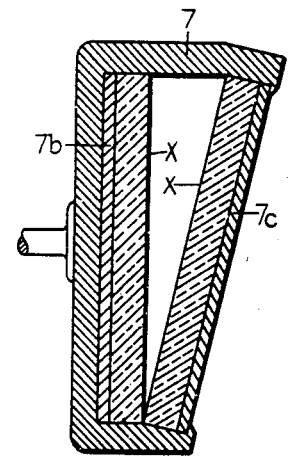
Figure 7 is a similar view showing a different arrangement of the mirror films.

Figure 7 shows a similar arrangement in which two flat pieces of glass are carried in a frame 7. In this instance, the front glass carries a mirror film 7*c* on its front surface and the rear glass carries a mirror film 7*b* on its rear surface.

Figure 8:
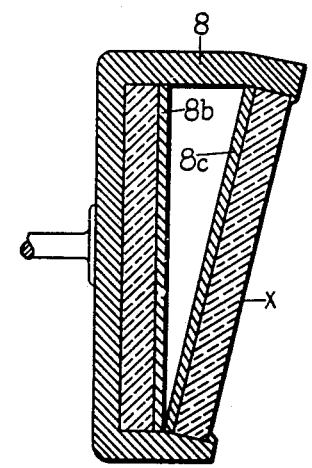
Figure 8 is a similar view showing another arrangement of the mirror films.

In Figure 8, the two pieces of glass are disposed in similar angular position in a frame 8. However, the front glass carries a mirror film 8*c* on its rear surface and the rear glass carries a film 8*b* on its front surface.

Figure 9:
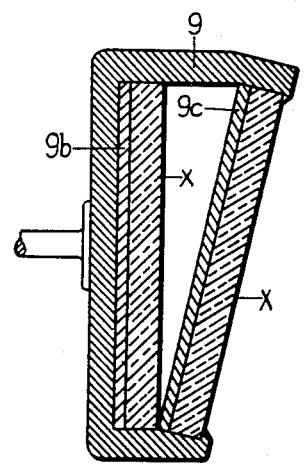
Figure 9 is a similar view showing still another arrangement of the mirror films.

In Figure 9, still another arrangement of the films is shown. In this case, the two pieces of glass are held at a desired angle in a frame 9. The front glass has a mirror film 9*c* on its rear surface and the rear glass also has the mirror film 9*b* on its rear surface.

Such arrangements utilizing two flat pieces of glass tend to give some lack of clarity in use, due to faint but disturbing reflections occurring at the plain uncoated glass surfaces in addition to the images formed upon the desired mirror surfaces. Such plain uncoated surfaces are designated by the letter *x* in each of Figures 6 to 9. This can be prevented and high clarity mirrors secured if the glass surfaces marked *x* in these figures are treated beforehand with a transparent thin deposit of material such as calcium or magnesium fluoride applied in the known manner to make these glass surfaces essentially non-reflective but still transparent.

The use of the solid prism also avoids such troubles and the reflection from either mirror surface *c* or *b*, in Figure 1, is of the very high clarity characteristic of first surface mirrors, since in neither case are there any slight ghost reflections to cause visual confusion.

For my back mirror coating *b* I have found that any material having a specular reflectivity of 45 to 95% may be used. Thus, silver and aluminum of 90% reflectivity are found to be excellent for this purpose. I may also use magnesium, having a reflectivity of 73%, platinum, having a reflectivity of 63%, iron, having a reflectivity of 55%, chromium, having a reflectivity of 55%, nickel, having a reflectivity of 60%, and rhodium, having a reflectivity of 75%. I may use other materials such as cobalt, iridium, indium, antimony, molybdenum, palladium, cadmium and other silvery appearing metals.

I may also use for my back mirror coating *b* colored reflectors, such as gold of 75% reflectivity or copper of 55% reflectivity. I may also use semi-transparent reflective layers, as the mirror film *b*, which are colored by light interference effects as disclosed in the co-pending applications of William H. Colbert and Willard L. Morgan, Serial Nos. 473,473 and 473,474, filed January 25, 1943. The use of a colored reflective layer in the second surface mirror film $b$ does not, of course, give any coloration to the front mirror reflection, reflection by film $c$, but does control the color of the daylight reflecting mirror, surface $b$. The color of the second surface mirror $b$ and the reflectivity as used in daylight may also be colored by the use of a colored prism or of colored glass plates. Also, if the front surface mirror film $c$ is colored by selective reflection or by interference effects, by using materials hereinafter referred to, not only is the reflection from this surface colored, but a color is imparted to the second surface mirror reflection from film $b$, also by reason of the selective colored light transmission of this semi-transparent coating $c$. Thus, my mirror may not only give colored reflections but the two reflections in the different positions of use do not of necessity appear of similar color but are frequently of different colors as well as of different reflectivities.

I have found that a wide range of materials may be used in forming the semi-transparent front surface mirror layer $c$. Thus, silver, gold, copper and many of the other reflective metals already indicated, can be used on this surface provided they give films of the desired 10% to 30% reflectively and are at the same time semi-transparent. The transparency desired is greater than 35%. I have found that, as the thickness of deposit of most of the metals is increased, the reflectivity increases and the transparency decreases until the films become opaque. Hence, with many substances, it is readily possible to secure the desired combination of reflectivity of 10 to 30% with a transmission of over 35%. Many materials of ordinarily low reflectivity, such as lead sulfide of 30% in opaque films, cannot be secured, however, in films which will fit both conditions.

Either of the mirror films may be made by chemical deposition methods such as are known for gold, silver and copper or the mirror films may be made by sputtering or by thermal evaporation in a high vacuum, the latter method being adaptable to a wide variety of substances.

I have found chromium films deposited by thermal evaporation particularly attractive for use in either or both of my mirror layers in that they adhere excellently to glass and are not altered by atmospheric action. Chromium is particularly useful as the coating material for the first surface mirror $c$ as the thin semi-transparent layers of this material are firmly attached to the glass and cannot be rubbed off, whereas many of the other metals in the desired thickness to secure the character desired are easily marred, scratched, stained or even readily removed on slight rubbing. In these latter cases I prefer to coat the layer $c$ with a clear transparent lacquer or resinous material but this is not at all necessary with the chromium coatings. In mirrors made as shown in the drawings, I frequently protect the exposed surface of the back coating $b$ from scratching and atmospheric attack by coating this with a paint or lacquer. Figure 8 presents a construction which by reason of the enclosed position of the mirror films directly affords such protection without coating such films.

The nature of my new mirrors and their means of formation will be more clearly apparent from the following examples.

Example 1

Two pieces of ordinary plate glass were cut of rear view automotive size and thoroughly cleaned. One of these pieces was placed in a high vacuum and chromium was thermally evaporated on one surface thereof to produce an ordinary chromium mirror of 55% reflectivity. The second piece was likewise coated with chromium on one surface thereof by thermal evaporation but a shorter time of deposition was used so as to produce a coating showing only 10% reflectivity and a transmission of light of 59%. The back or other side of this second glass piece was also then coated by thermal evaporation with a very thin layer of magnesium fluoride sufficient to essentially destroy reflection of light from this surface by a method now commonly practiced. The two glass pieces were then mounted in a frame, as in Figure 6, with an angle between the glasses of 5° and with the semi-transparent mirrored glass used as the face of the combination. The mirror arrangement produced showed a reflectivity of 10% from the front surface $6c$ and, as used in night driving, no glaring was evident. From the back surface $6b$ a reflectivity of 32.5% was found which gave clear nonglaring good vision for driving in the daytime. Both mirror coatings were very stable and needed no protection.

Examples 2 to 6

Five glass prisms having an angle of 3.5 degrees between the surfaces were thoroughly cleaned and then coated by thermal deposition in a high vacuum with chromium deposits of increasing thicknesses. The reflectivity value directly from these deposits and the light transmission of these films were measured, as shown in the following table. Each of the prisms was then coated on the back with aluminum by thermal evaporation. When used as rear view automobile mirrors, the reflectivity from the front surface mirror $c$, as used in night driving, was as in column 1 and, as used in daytime driving, using the second surface mirror $b$, the reflectivity was as shown in the third column.

| Example | Front surface reflectivity | Transmission of light by front surface mirror | Second surface reflectivity |
|---|---|---|---|
| | Percent | Percent | Percent |
| 2 | 10 | 59 | 53 |
| 3 | 15 | 55 | 50 |
| 4 | 20 | 50 | 45 |
| 5 | 25 | 45 | 40 |
| 6 | 30 | 41 | 37 |

Each of these mirrors was found to be nonglaring at night and to present exceptional clarity and visibility under either night or day driving, under which latter condition there was also no glare. The second surface mirror reflections are of a slight reddish brown shade. Examples 3 and 4 were found to be preferable in all respects. It is apparent that in all of these examples I have secured the desired limitation on reflectivity at night to eliminate glare and have done so in a way which has avoided sacrificing good reflectivity and visibility in daytime. If instead of backing the mirrors with aluminum, I coat the backs with silver by chemical deposition, using for instance a mixed silvering solution of alkaline silver nitrate and an invert sugar solution as a reducer, I secure mirrors which show practically the same reflectivities as the examples shown.

Example 7

A plastic prism made from "Columbia resin," produced by the Pittsburgh Plate Glass Company, which is apparently a modified type of methacrylic, styrol or vinyl type of resin, was cleaned and placed in a high vacuum. A thin deposit of chromium was laid down on the front surface of such prism and was of such a nature that it reflected 20% of visible light and showed a light transmission of 50%. A layer of gold was then deposited on the back, the operation being again done in a high vacuum and by either thermal evaporation or by sputtering. Prisms of 2 to 10 degree angles between the two surfaces were found satisfactory. The mirror structure gave a reflection off the front surface of 20%, which was highly satisfactory for use in night driving. From the back surface, as used in daytime driving, the reflectivity was 37.5%, and this reflection had the gold color.

*Example 8*

A glass prism with a 3 degree angle was coated on the front by thermal evaporation in a high vacuum with a thin coating of copper so that the copper surface showed a reflectivity of 20%. This was secured with a copper film of 0.011 micron thickness and the reflection color was not a coppery color but a blue color resulting from light interference effects. The production of mirror reflective films of various colors by light interference is more clearly set forth in copending patent applications Serial Nos. 473,473 and 473,474, previously referred to herein. This film showed a light transmission of 53% and by transmission was of a light pinkish brown color. In order to prevent this film changing and to protect it I covered it with a transparent lacquer. If before applying the copper film, a mirror deposit of silver was deposited by chemical deposition on the back side of the prism, I secured a mirror which was useful as a rear view automotive mirror. This gave colored mirror reflections from both surfaces. From the front copper surface came a blue reflection of 20%, useful in night driving. From the back surface mirror, the reflectivity used in daylight driving was 48% and this was of a pinkish-brown color.

*Example 9*

Another glass prism was coated on its front surface with the thin deposit of copper, described in the last example, and this was also protected by a coating of a transparent lacquer. Prior to depositing the copper, however, a coating of gold was first applied to the back surface of the prism by chemical deposition methods. This gave a mirror in which both reflections were also colored, the front one again being a blue reflection of 20%. For day driving, the back surface mirror showed a reflectivity of 40% and was of an orange color. In order to protect the gold film, it was coated with an opaque black lacquer.

*Example 10*

Two sheets of glass, cut to rear view automotive mirror pattern, were prepared by treating one side of each with magnesium fluoride to make it non-reflective. The other side of one sheet was then coated with copper by a chemical deposition method. The other side of the remaining sheet was then coated by mounting it in a high vacuum and giving it a thin deposit of gold by thermal evaporation. A film 0.006 micron was deposited and showed a reflectivity of 20%. This film was of a light coppery red color, since interference of light was caused by this semi-transparent coating and color effects thus arose as well as coloration by the selective reflective characteristics of the gold directly. The film showed 68% light transmission and was of a light green-yellow color by transmission. These two pieces of glass were sealed into a frame in the manner shown in Figure 9, the glass carrying the gold film being placed in front, with the delicate gold film 9c protected by mounting it on the inside and with the non-reflective glass surface on the outside. The copper coated glass was mounted with the copper coating 9b in the back. Under night driving conditions, a non-glaring clear image of 20% was visible in the front gold mirror, this being of a light coppery red color. In daytime use, the back mirror reflection was 37% and was of an orange-yellow color, due to the combined action of the front mirror transmission characteristics and the selective color reflection characteristics of the second surface copper mirror.

*Example 11*

One piece of glass of desired rear view mirror size, preferably coated on one side with a non-reflective coating of magnesium fluoride, was given a thin coating of silver of .012 gram per square foot by thermal evaporation in a high vacuum. This coating was prepared so that it had a reflectivity of 30% and a light transmission value of 47%. By using the ordinary glass and using the magnesium fluoride treatment on one surface thereof, the silver film was found to give a reflectivity of 30% and a transmission of 50%. A second piece of ordinary glass was given a normal silver mirror coating of 0.100 gram per square foot, which was opaque and which could be used as a first surface reflector. This coating was formed by either thermal evaporation of silver in a high vacuum or by use of the invert sugar and alkaline silver nitrate chemical deposition methods. This reflector had a reflectivity of 90%. Both silver surfaces were next preferably coated with a transparent lacquer coating and were then mounted in a frame, as shown in Figure 8. The thin silver film is not very adherent to the glass and can be easily dislodged on rubbing so that mounting this on the inside of the frame as in Figure 8 is desirable. With both silver films 8b and 8c mounted inside the frame, they are also protected against tarnish by the atmosphere. Mounting the two glasses at an angle of 4 degrees to each other, gave a satisfactory rear view mirror in which the night driving reflectivity on the front transparent mirror film 8c was of 30% and the day driving reflectivity coming from the back silver mirror 8b was of 45% when the front glass surface was treated with magnesium fluoride. If it was not treated with magnesium fluoride the reflectivity found was 42%.

*Example 12*

A piece of glass pretreated on one side with magnesium fluoride to reduce reflectivity from this surface was coated on its other side with a silver film showing 15% reflectivity and 59% transmission. This silver coating was protected with a transparent lacquer and mounted in the front of a frame, as in Figure 8. An ordinary piece of glass having its front surface coated with chromium on one surface was also placed in the back of the frame. In addition to the 15% reflectivity, found useful in night driving, coming from the front silver mirror 8c, by slight tilting of the mirror, an image was given off the chromium surface 8b in the back of 32% reflectivity which was useful in daytime driving.

From the above examples, it will be apparent that I have provided a prismoidal mirror having a number of important advantages. It is particularly useful as a rear vision mirror for automobiles under present-day driving conditions. It can be adjusted easily and simply for use in the daytime or for use at night. In daytime use it will give a clear image without excessive glare. In nighttime use it will give a clear image without glare from the bright headlights now commonly in use.

Various other advantages will be apparent from the preceding description and the following claims.

Having thus described my invention, what I claim is:

1. A mirror comprising a transparent support of prism form which is wedge-shaped in transverse cross-section so that its forward and rear surfaces are disposed at a small angle relative to each other, a mirror film of semi-transparent chromium of a reflectivity of approximately 10 per cent to 30 per cent deposited upon said forward surface and forming a first surface mirror for night use, and a mirror film of aluminum deposited upon said rear surface and forming a second surface mirror for day use, the angle between the forward and rear surfaces of the prism being sufficient to distinctly separate the images formed on the two films, said aluminum film having an effective reflectivity to produce an adequate clear reflected image visible from the front of the mirror.

2. A rear view automobile mirror comprising a transparent glass support of prism form which is wedge-shaped in transverse cross-section so that its forward and rear surfaces are disposed at an angle of approximately 2° to 10° relative to each other, a partially transparent mirror film of a reflectivity of approximately 10 per cent to 30 per cent deposited upon said forward surface and forming a first surface mirror for night use, and a mirror film deposited upon said rear surface and forming a second surface mirror for day use and providing in combination with the front surface mirror acting as a filter an effective reflectivity sufficiently greater than 30 per cent to secure an adequate clear reflected image.

3. A rear view automobile mirror comprising a transparent glass support of prism form which is wedge-shaped in transverse cross-section so that its forward and rear surfaces are disposed at an angle of approximately 2° to 10° relative to each other, a transparent mirror film of chromium having a reflectivity of approximately 10 per cent to 30 per cent deposited upon said forward surface and forming a first surface mirror for night use, and a mirror film of aluminum deposited upon said rear surface and providing on said surface a second surface mirror for day use functioning in combination with the chromium film acting as a filter, to produce an effective reflectivity greater than 30 per cent to secure an adequate clear reflected image.

4. A mirror comprising a transparent support of prism form having front and rear surfaces at an angle to each other, a semi-transparent mirror film deposited on said front surface and forming a first surface mirror of a reflectivity of approximately 10 percent to 30 percent for night use and a mirror film deposited on said rear surface and forming a second surface mirror for day use of an effective reflectivity as modified by said first surface mirror sufficiently greater than 30 percent to secure an adequate clear reflected image.

5. A mirror comprising a transparent support of prism form having front and rear mirror film supporting surfaces, a semi-transparent mirror film deposited on said front film supporting surface and forming a first surface mirror for night use having a reflectivity of approximately 10 percent to 30 percent and a mirror film deposited on said rear film supporting surface and forming a second surface mirror for day use having an effective reflectivity as modified by said first surface mirror sufficiently greater than 30 percent to secure an adequate clear reflected image.

6. A rear view automobile mirror comprising a transparent glass support of prism form which is wedge-shaped in transverse cross section so that its forward and rear surfaces are disposed at a small angle relative to each other of approximately 3½°, a mirror film of semi-transparent chromium deposited upon said forward surface and forming a first surface mirror for night use and a mirror film deposited upon said rear surface and forming a second surface mirror for day use, said chromium mirror film having a reflectivity to produce an adequate clear reflected image and said other mirror film having an effective reflectivity to produce an adequate clear reflected image visible through said chromium mirror film.

7. A mirror comprising a frame, transparent front and rear glass members on said frame each having a mirror film supporting surface at an angle to the mirror film supporting surface of the other, a semi-transparent mirror film deposited on the film supporting surface of said front glass member and forming a first surface mirror for night use having a reflectivity of approximately 10 percent to 30 percent, and a mirror film deposited on the film supporting surface of said rear glass member and forming a second surface mirror for day use having an effective reflectivity as modified by said first surface mirror sufficiently greater than 30 percent to secure an adequate clear reflected image.

8. A mirror according to claim 5, in which both of the mirror films are of chromium.

WILLIAM H. COLBERT.